United States Patent
Wang

(10) Patent No.: US 11,158,033 B2
(45) Date of Patent: Oct. 26, 2021

(54) METHOD FOR IMAGE PROCESSING, ELECTRONIC DEVICE, AND NON-TRANSITORY STORAGE MEDIUM FOR IMPROVING CONTRAST OF IMAGE

(71) Applicant: Guangdong OPPO Mobile Telecommunications Corp., Ltd., Guangdong (CN)

(72) Inventor: Huichao Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 181 days.

(21) Appl. No.: 16/544,263

(22) Filed: Aug. 19, 2019

(65) Prior Publication Data

US 2020/0058112 A1 Feb. 20, 2020

(30) Foreign Application Priority Data

Aug. 20, 2018 (CN) .......................... 201810948468.1

(51) Int. Cl.
*G06K 9/00* (2006.01)
*G06T 5/20* (2006.01)
(Continued)

(52) U.S. Cl.
CPC .................. *G06T 5/20* (2013.01); *G06T 5/50* (2013.01); *G06T 7/13* (2017.01); *G06T 7/90* (2017.01);
(Continued)

(58) Field of Classification Search
CPC .... G06T 5/20; G06T 7/13; G06T 7/90; G06T 5/50; G06T 11/001; G06T 2207/20024;
(Continued)

(56) References Cited

U.S. PATENT DOCUMENTS 6,189,064 B1 * 2/2001 MacInnis ................. H04N 9/45
710/244
8,294,781 B2 10/2012 Cote et al.
(Continued)

FOREIGN PATENT DOCUMENTS

CN 1440542 A 9/2003
CN 1898945 A 1/2007
(Continued)

OTHER PUBLICATIONS

Notification to Grant Patent Right for Invention with English Translation Chinese application No. 201810948468.1, dated Nov. 18, 2020 (6 pages).

(Continued)

*Primary Examiner* — Andrew M Moyer
(74) *Attorney, Agent, or Firm* — Young Basile Hanlon & MacFarlane, P.C.

(57) ABSTRACT

A method for image processing, an electronic device, and a non-transitory storage medium are disclosed. The method includes obtaining an image captured by the camera and performing edge identification on the image; determining a filtering kernel for a filtering processing on the image according to a result of the edge identification; performing the filtering processing on the image based on the filtering kernel to obtain a low-frequency image and a high-frequency image corresponding to the image; and performing an enhancement processing for the high-frequency image and performing image fusion for the low-frequency image and the enhanced high-frequency image to obtain a processed image.

19 Claims, 6 Drawing Sheets

(51) Int. Cl.
*G06T 7/13* (2017.01)
*G06T 7/90* (2017.01)
*G06T 5/50* (2006.01)
*G06T 11/00* (2006.01)

(52) U.S. Cl.
CPC .. *G06T 11/001* (2013.01); *G06T 2207/20024* (2013.01); *G06T 2207/20221* (2013.01)

(58) Field of Classification Search
CPC ........... G06T 2207/20221; G06T 5/003; G06T 2207/10004; G06T 2207/20021; G06T 2207/20192
USPC ................................................ 382/254–308
See application file for complete search history.

(56) References Cited

U.S. PATENT DOCUMENTS

| | | | |
|---|---|---|---|
| 8,391,627 B1 | 3/2013 | Worthington | |
| 2002/0039152 A1* | 4/2002 | Choi | G06T 5/50 382/260 |
| 2007/0009170 A1* | 1/2007 | Lin | G06T 5/50 382/260 |
| 2014/0133778 A1* | 5/2014 | Sasaki | G06T 5/004 382/274 |
| 2017/0277941 A1* | 9/2017 | Smith | G06K 9/00335 |
| 2021/0090228 A1* | 3/2021 | Jiang | H04N 9/45 710/244 |

FOREIGN PATENT DOCUMENTS

| | | |
|---|---|---|
| CN | 101488219 A | 7/2009 |
| CN | 101860667 A | 10/2010 |
| CN | 102214357 A | 10/2011 |
| CN | 102999928 A | 3/2013 |
| CN | 103345726 A | 10/2013 |
| CN | 103536299 A | 1/2014 |
| CN | 104240183 A | 12/2014 |
| CN | 104616268 A | 5/2015 |
| CN | 105791790 A | 7/2016 |
| CN | 106846270 A | 6/2017 |
| CN | 107231505 A | 10/2017 |
| CN | 107767356 A | 3/2018 |
| CN | 109146814 A | 1/2019 |
| WO | 2016135777 A1 | 9/2016 |

OTHER PUBLICATIONS

Application of sequence filter in defect edge detection; Jia-hui Cong, Yun-hui Yan, Zi-qian Zhang, Yu-lan Wei; Computer engineering and Application; vol. 46 No. 36, Issue date Dec. 21, 2010 (13 pages).
English Translation of First Chinese Office Action dated Apr. 3, 2020 from Application No. 201810948468.1.
International Search Report and Written Opinion for PCT/CN2019/100539, dated Oct. 30, 2019 (4 pages).
European Search Report and Written Opinion for European application No. 19192429.9, dated Nov. 20, 2019 (11 pages).
Bamber David C et al : "Novel adaptive kernels for image sharpening in the presence of noise"(7 pages).
Kaiming He et al :"Guided Image Filtering",(13 pages).
Matthias Bruggemann et al :"Adaptive directional filter kernels for ringing and staircase artifact reduction" (6 pages).
Zheng Xianhui et al :"Single- Image-Based Rain and Snow Removal Using Multi-guided Filter"(8 pages).
Indian Examination Report for IN Application 201914033372 dated Jul. 20, 2021. (5 pages).

* cited by examiner

METHOD FOR IMAGE PROCESSING, ELECTRONIC DEVICE, AND NON-TRANSITORY STORAGE MEDIUM FOR IMPROVING CONTRAST OF IMAGE

CROSS-REFERENCE TO RELATED APPLICATION(S)

This application claims priority to Chinese Patent Application No. 201810948468.1, filed on Aug. 20, 2018, the content of which is herein incorporated by reference in its entirety.

TECHNICAL FIELD

The present disclosure generally relates to the technical field of electronic device, and in particular to a method for image processing, an electronic device, and a non-transitory storage medium.

BACKGROUND

With rapid development of electronic apparatuses, the electronic apparatuses, such as mobile phones and tablet computers, all have image capturing functions, and users have increasingly high requirements for quality of images captured by the electronic apparatuses.

In order to improve definition of image details, adjusting contrast of images is a common method in image processing. However, the adjusting image contrast is currently applied for the processing of medical images such as X-ray images. The limit of the application field leads to that fixed parameters are used in image contrast processing, and are not applicable to images containing complex information collected by electronic devices. The image processed by the current contrast adjustment method has problems of image fogging and ashing.

SUMMARY

According to one aspect of the present disclosure, a method for image processing is provided. The method is applied for an electronic device includes a camera. The method includes obtaining an image captured by the camera and performing edge identification on the image; determining a filtering kernel for a filtering processing on the image according to a result of the edge identification; performing the filtering processing on the image based on the filtering kernel to obtain a low-frequency image and a high-frequency image corresponding to the image; and performing an enhancement processing for the high-frequency image and performing image fusion for the low-frequency image and the enhanced high-frequency image to obtain a processed image.

According to another aspect of the present disclosure, an electronic device is provided. The electronic device includes a camera configured to capture an image, a non-transitory memory storing a computer program, and a processor, wherein the processor is configured to execute the computer program to: perform edge identification and an adaptive filtering processing on the image to obtain a low-frequency image and a high-frequency image corresponding to the image, wherein a filtering kernel of the adaptive filtering processing is adaptively determined according to edge information in the image; perform an enhancement processing for the high-frequency image; and perform image fusion for the low-frequency image and the enhanced high-frequency image to obtain a processed image.

According to yet another aspect of the present disclosure, a non-transitory storage medium is provided. The non-transitory storage medium stores a computer program, when executed, causing a processor to: perform edge identification and an adaptive filtering processing on the image to obtain a low-frequency image and a high-frequency image corresponding to the image, wherein a filtering kernel of the adaptive filtering processing is adaptively determined according to edge information in the image; perform an enhancement processing for the high-frequency image; and perform image fusion for the low-frequency image and the enhanced high-frequency image to obtain a processed image.

DETAILED DESCRIPTION

Figure 1:
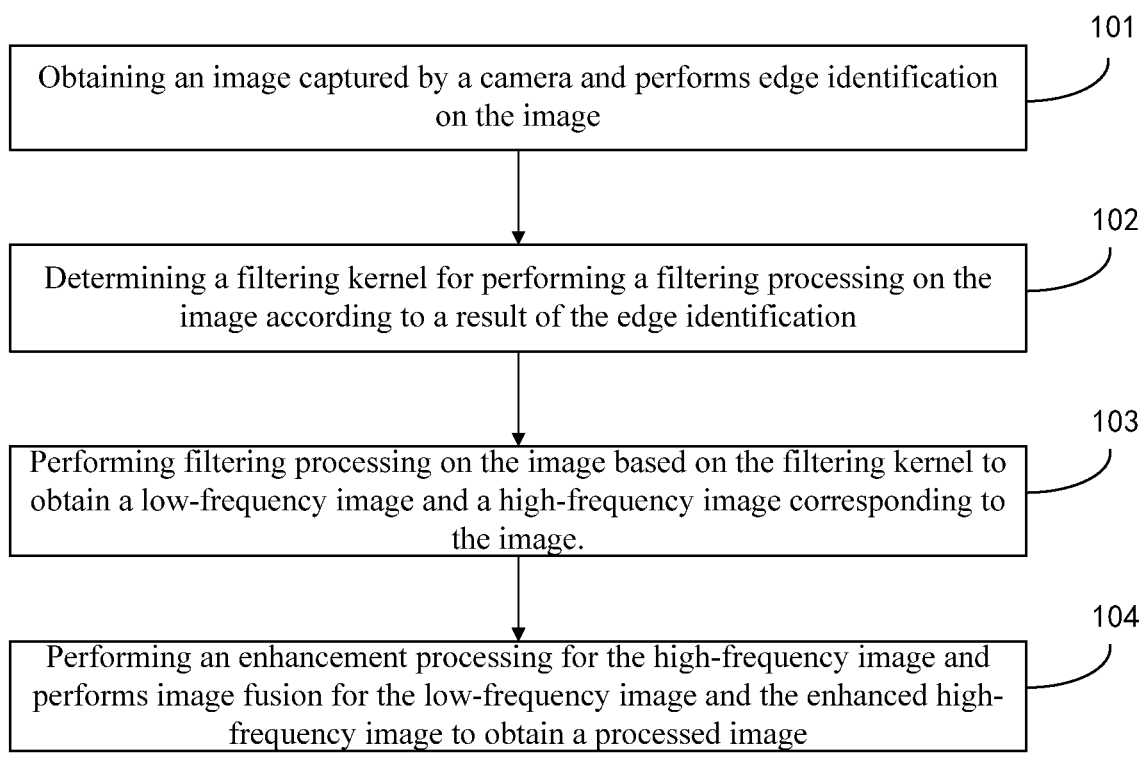
FIG. 1 is a flow chart diagram of a method for image processing according to an embodiment of the present disclosure.

Technical solutions of the present disclosure are to be further described according to detailed implementations and appended figures. It should be understood that, the detailed embodiments described herein are for the purposes of explaining the present disclosure, but should not limit the scope of the present disclosure. In addition, it should be noted, to describe the embodiments easily, the appended figures illustrate only partial structure related to the present disclosure, but not the whole structure.

Before detailed description of exemplary embodiments, it should be noted that, some exemplary embodiments may be described to be a process or method in the form of a flow chart. Although the flow chart may describe each step as a process to be performed in order, many of the steps may be performed in parallel, concurrently or simultaneously. Further, the order of the steps may be rearranged. When an operation is completed, the process may be terminated, but may contain additional steps that are not shown in the figures. The process may relate to a method, a function, a procedure, a sub-routine, a sub-program and the like.

A method for image processing is provided. The method is applied for an electronic device includes a camera. The method includes obtaining an image captured by the camera and performing edge identification on the image; determining a filtering kernel for a filtering processing on the image according to a result of the edge identification; performing the filtering processing on the image based on the filtering kernel to obtain a low-frequency image and a high-frequency image corresponding to the image; and performing an enhancement processing for the high-frequency image and performing image fusion for the low-frequency image and the enhanced high-frequency image to obtain a processed image.

In one embodiment, the image is in a chrominance-luminance separated color mode, and the chrominance-luminance separated color mode includes YUV color mode and LAB color mode. The performing the filtering processing includes performing the filtering processing for luminance components of the image based on the filtering kernel.

In one embodiment, the camera includes an image sensor; and generating the image in the chrominance-luminance separated color mode includes converting raw signals captured by the image sensor into an image in RGB color mode; and generating the image in YUV color mode based on the image in RGB color mode.

In one embodiment, the determining a filtering kernel for a filtering processing on the image according to a result of the edge identification includes determining an edge coefficient in the image according to the result of the edge identification, wherein the edge coefficient indicates edge information in the image; and determining a size of the filtering kernel according to the edge coefficient, wherein the size of the filtering kernel is positively correlated with the edge coefficient.

In one embodiment, the image is divided into a non-background region where edge information is located and a background region. A size of the filtering kernel is adaptively determined according to a location where edge information is located, wherein the size of the filtering kernel for the non-background region is larger than that for the background region.

In one embodiment, the performing the enhancement processing for the high-frequency image includes: determining a first gain coefficient of the high-frequency image, wherein the first gain coefficient includes gain values of all pixels in the high-frequency image, wherein one gain value of one pixel is determined according to a local standard deviation of a window with a preset size and with the one pixel as a center, the local standard deviation of the window is obtained by calculating a local variance of the window; and performing the enhancement processing for the high-frequency image according to the first gain coefficient.

In one embodiment, the one gain value of the one pixel is inversely proportional to the local standard deviation of the window with the one pixel as a center.

In one embodiment, before performing the enhancement processing for the high-frequency image according to the first gain coefficient, the method further includes correcting the first gain coefficient according to a result of scene identification for the image. The result of scene identification includes a radio of high-frequency information to low-frequency information in the image.

In one embodiment, the first gain coefficient is reduced when the radio of high-frequency information to low-frequency information in the image is larger than a preset value.

In one embodiment, the gain values in the first gain coefficient have different adjustment values. One of the gain values is subtracted by one corresponding adjustment value such that the first gain coefficient is reduced.

In one embodiment, the adjustment values are determined according to luminance components of all pixels, wherein an adjustment value for one pixel is negatively correlated with a luminance component of the one pixel.

In one embodiment, the method further includes determining a second gain coefficient of the low-frequency image; performing enhancement processing for the low-frequency image according to the second gain coefficient; and performing image fusion for the enhanced high-frequency image and the enhanced low-frequency image to obtain the processed image.

In one embodiment, the performing enhancement processing for the low-frequency image according to the second gain coefficient includes identifying a flat region and a non-flat region in the low-frequency image according to luminance information in the low-frequency image; and performing the image enhancement for the non-flat region according to the second gain coefficient. The processed image is obtained by performing image fusion for the flat region, the enhanced non-flat region, and the enhanced high-frequency image.

In one embodiment, the low-frequency image is partitioned into a plurality of image-regions, and each image-region has a pixel difference value indicating a difference condition of luminance information of all pixels in the each image-region. The flat region includes the image-regions of which pixel difference values are smaller than or equal to a preset value. The non-flat region includes the image-regions of which pixel difference values are greater than the preset value.

In one embodiment, the pixel difference value of the each image-region is calculated in the following formula:

$$A = \frac{1}{p}\sum_{b=1}^{p}(g_b - \overline{g})$$

wherein A is the pixel difference value, p is a total number of pixels in the each image-region, $g_b$ (b=1, 2, ... p) image-region, is a luminance component of one pixel in the each image-region, $\overline{g}$ is a local luminance mean value of the each image-region, and both p and b are positive integers greater than 0. The preset value is determined according to a local difference mean value calculated according to a number of the image-regions and the pixel difference value of the each image-region.

An electronic device is provided. The electronic device includes a camera configured to capture an image, a non-transitory memory storing a computer program, and a processor, wherein the processor is configured to execute the computer program to: perform edge identification and an adaptive filtering processing on the image to obtain a low-frequency image and a high-frequency image corresponding to the image, wherein a filtering kernel of the adaptive filtering processing is adaptively determined according to edge information in the image; perform an enhancement processing for the high-frequency image; and perform image fusion for the low-frequency image and the enhanced high-frequency image to obtain a processed image.

In one embodiment, the image is divided into a plurality of regions; and the size of the filtering kernel for one region with edge information is larger than that for another region without edge information.

In one embodiment, the image is in a chrominance-luminance separated color mode, and the chrominance-luminance separated color mode includes YUV color mode and LAB color mode; and luminance components of the image are performed the filtering processing.

In one embodiment, the camera includes an image sensor configured to capture raw signals; and the image in YUV color mode is generated based on an image in RGB color mode converted from the raw signals.

A non-transitory storage medium is provided. The non-transitory storage medium stores a computer program, when executed, causing a processor to: perform edge identification and an adaptive filtering processing on the image to obtain a low-frequency image and a high-frequency image corresponding to the image, wherein a filtering kernel of the adaptive filtering processing is adaptively determined according to edge information in the image; perform an enhancement processing for the high-frequency image; and perform image fusion for the low-frequency image and the enhanced high-frequency image to obtain a processed image.

FIG. 1 is a flow chart diagram of a method for image processing according to an embodiment of the present disclosure. The method may be performed by an apparatus for image processing, wherein the apparatus may be realized by software and/or hardware, and may usually be integrated in an electronic device. Referring to FIG. 1, the method may include actions/operations in the following blocks.

At block 101, the method obtains an image captured by a camera and performs edge identification on the image.

To be exemplary, the electronic device in embodiments of the present disclosure may be a smart device configured with an image capture apparatus, such as a mobile phone and a tablet computer.

In this embodiment, the image can be an image shot by the camera according to a shooting instruction. The image can also be an image captured by the camera and displayed on a screen of the electronic device for users to preview, before the shooting instruction is executed for the camera.

Edge identification is performed on the image to extract a boundary line between an object and background in the image. Contour points in the image may be detected firstly, and then the detected contour points are connected according to a link rule. Meanwhile, omitted boundary points are also detected and connected, and false boundaries are removed. The purpose of the edge identification is to discover information on shape and reflection or transmittance in the image. Exemplarily, adjacent pixel values or luminance values of the pixels in the image may be detected row by row and column by column to determine pixels with changed-wildly pixel values or luminance values as edge pixels. The edge pixels may be connected to form an edge. Alternatively, edge identification may also be performed on the image to calculate the image based on a Roberts edge operator, a Sobel edge detection operator, or a Laplacan edge operator, which is not limited.

At block 102, the method determines a filtering kernel for performing a filtering processing on the image according to a result of the edge identification.

The result of the edge identification can be to output edge information in the image or generate feature values which indicate the edge information based on the identified edge information. The filtering kernel is an operator kernel of a filter for performing the filtering processing on the image. Filtering kernels with different sizes have different filtering effects. For example, for a filter with a smaller filtering kernel, when performing filtering processing, small details in the image may be preserved, whereas for a filter with a larger filtering kernel, when performing filtering processing, a large contour in the image may be preserved. Exemplarily, the filtering kernel may be, but not limited to, 3×3, 5×5, 7×7, or 9×9, etc.

In this embodiment, there are large difference among image contents, which are captured when the electronic device shoots different objects. Edge identification is performed on the image, and a filtering kernel applicable to the image is determined, so that the image contents are preserved in the filtering process, thereby preventing loss of detail information or contour information in the image. Alternatively, determining a filtering kernel for performing filtering processing on the image according to the result of the edge identification includes: determining an edge coefficient in the image according to the result of the edge identification; and determining a size of the filtering kernel for performing filtering processing on the image according to the edge coefficient, wherein the size of the filtering kernel is positively correlated with the edge coefficient. The edge coefficient of the image is a feature value used to indicate the edge information. That is, the edge coefficient of the image is used to indicate the edge information in the image. Exemplarily, the larger the edge coefficient is, the more edge information the image includes, whereas the smaller the edge coefficient is, the less edge information the image includes. In order to preserve information in the image, the size of the filtering kernel is positively correlated with the edge coefficient. That is, the larger the edge coefficient of the image is, the larger the filtering kernel applied to the image will be. For example, when an image includes a white desktop and black buttons and spotted stains on the desktop, it can be learned that, the image is relatively flat and contains less edge information, an edge coefficient derived from the edge identification of the image is smaller, and correspondingly, the filtering kernel applied to the image is smaller, for example, may be a 3×3 filtering kernel. When an image includes a plurality of tables, chairs, cabinets, and a plurality of objects on the table, it can be learned that, the image is more complicated and contains more edge information, an edge coefficient derived from the edge identification of the image is larger, and correspondingly, the filtering kernel applied to the image is larger, for example, may be a 9×9 filtering kernel.

Alternatively, a position of the edge information in the image is determined according to the result of the edge identification for the image. The image is divided into a plurality of regions. The region with the edge information is filtered by a larger filtering kernel. The background region of the image is filtered by a smaller filtering kernel. In other word, the image is divided into a non-background region and a background region, and the edge information is located in the non-background region. A size of the filtering kernel is adaptively determined according to a location where edge information is located, wherein the size of the filtering kernel for the non-background region is larger than that for the background region. Thus, the image is filtered based on an adaptive filtering kernel, thereby preserving contour information and detail information of the image, so as to avoid loss of the image information.

At block 103, the method performs filtering processing on the image based on the filtering kernel to obtain a low-frequency image and a high-frequency image corresponding to the image.

In this embodiment, a filter for filtering the image is a low-pass filter, and correspondingly, a low-pass filtering processing is performed on the image. Specifically, a low-pass filtering processing is performed on the image to obtain a low-frequency image corresponding to the original image, and the low-frequency image is subtracted from the original image to obtain a high-frequency image corresponding to the original image. Specifically, pixel difference values of corresponding pixels between the original image and the low-frequency image to obtain a high-frequency image corresponding to the original image.

It should be noted that, since the image may be an image in a multi-color mode, such as an image in RGB color mode, or an image in YUV color mode, the data objects subjected to filtering processing are different for images in different color modes. For example, for an image in RGB color mode, the data object for filtering processing is an RGB value, and for an image in YUV color mode, the data object for filtering processing is an independent Y component (i.e. luminance component).

At block 104, the method performs an enhancement processing for the high-frequency image and performs image fusion for the low-frequency image and the enhanced high-frequency image to obtain a processed image.

The high-frequency image includes content information in the original image, and enhancement processing is performed for the high-frequency image, so that contrast between the enhanced high-frequency image and the low-frequency image could be improved. A dynamic range for the image is adjusted to highlight objects in the image and improve definition of the image. Exemplarily, the performing the enhancement processing for the high-frequency image may include setting gain values for the pixels in the high-frequency image; multiplying the gain values by the pixel values or luminance values of the pixels, respectively; and performing image fusion for the enhanced high-frequency image and the low-frequency image to obtain a processed image. The gain values for performing enhancement processing for the high-frequency image may be a fixed value. That is, the gain values for all pixels are identical. Alternatively, the gain values for performing enhancement processing for the high-frequency image may also be calculated according to the respective pixel, and differ according to the respective pixel. Correspondingly, when enhancement processing is performed for the high-frequency image, the pixel value or luminance value of each pixel is multiplied by a corresponding gain value to obtain an enhanced image with high-quality.

In the method for image processing according to embodiments of the present disclosure, edge identification is performed on a captured image, an adaptive filter kernel is determined according to the identification result of the image, the image is filtered on the image according to the filter kernel applied to the image to obtain a high-frequency image and a low-frequency image, and enhancement processing is performed for the high-frequency image to generate a processed image. Through the above technical solution, different types of filtering kernels are adopted for the differences of the image captured by the electronic device, which avoids the problem that loss of image information is caused since the fixed filtering kernel is poorly applicable, and is suitable for captured images by the electronic device with different scenes and different complexities.

Figure 2:
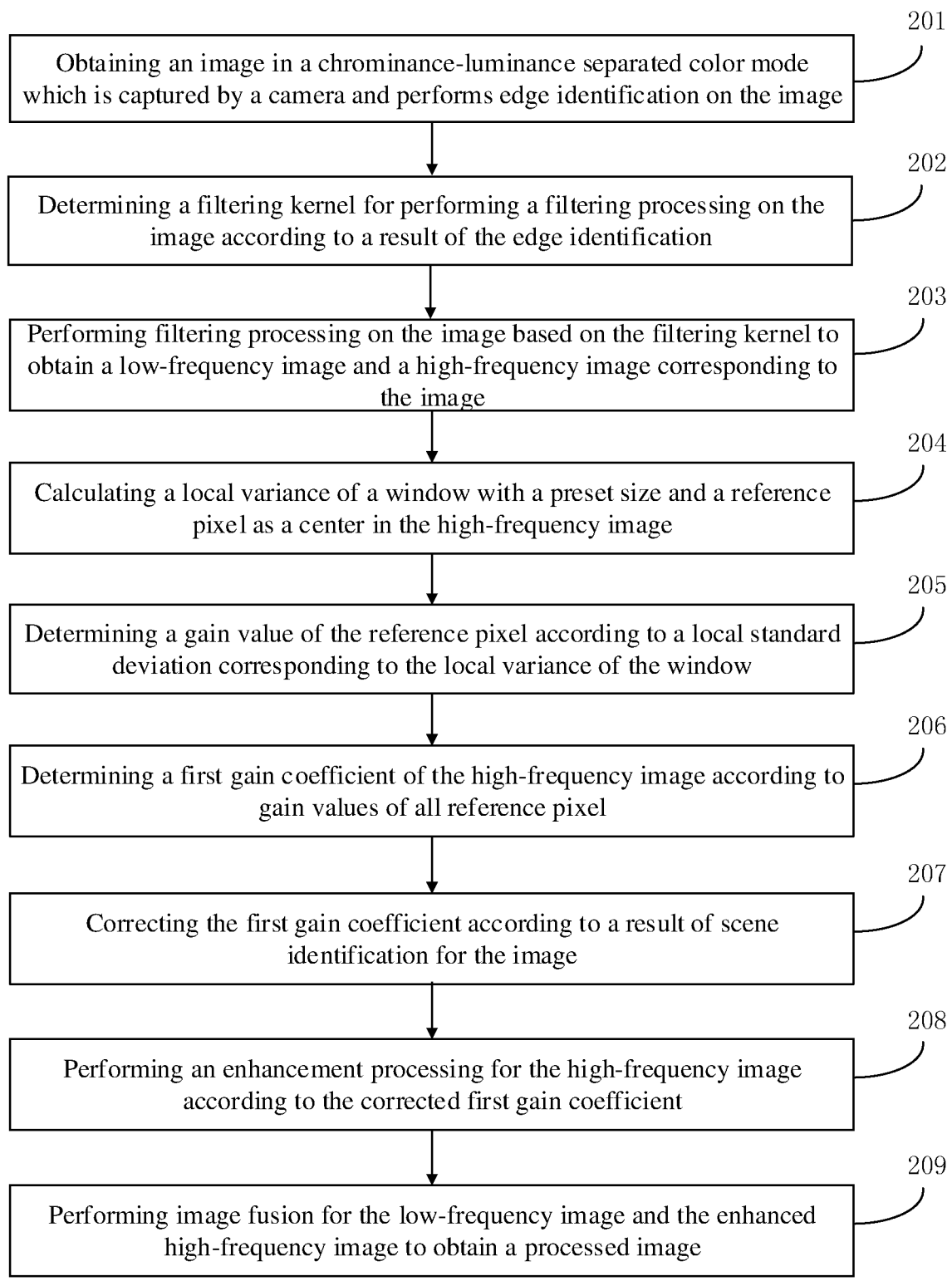
FIG. 2 is a flow chart diagram of another method for image processing according to an embodiment of the present disclosure.

FIG. 2 is a flow chart diagram of another method for image processing according to an embodiment of the present disclosure. Referring to FIG. 2, the method may include actions/operations in the following blocks.

At block 201, the method obtains an image in a chrominance-luminance separated color mode which is captured by a camera and performs edge identification on the image.

Exemplarily, the image in the chrominance-luminance separated color mode may be an image in YUV color mode or LAB color mode. In an image in the chrominance-luminance separation color mode, the luminance component and the chrominance component may be separately extracted, such that the image can be processed in terms of any of luminance and chrominance. Exemplarily, during processing of the luminance components, no impact will be exerted on the chrominance components of the image.

It should be noted that the RGB color mode, the YUV color mode, and the LAB color mode can be converted each other. With a mobile phone as an example, when an image is captured by an image capture apparatus within the mobile phone, a manner for generating an image in YUV color mode may include: converting raw data obtained by an image sensor into an image in the RGB color mode; and generating an image in the YUV color mode based the image in the RGB color mode. The image capture apparatus may be a camera, wherein the camera may include a charge-coupled device (CCD) image sensor or a complementary metal oxide semiconductor (CMOS) image sensor. Signals from a light source captured by the CCD image sensor or the CMOS image sensor may be converted into digital signals as the raw data, the raw data may be converted into data of an image in the RGB color mode, and the data of the image in RGB color mode is further converted into data of the image in the YUV color mode. With the image capture apparatus of the mobile phone, an image in the joint photographic expert group (JPG) format may be formed by the image in the YUV color mode.

Colors of the image in RGB color mode, which is converted from the raw data, may not be real colors of the image, and thus the data of the image in RGB color mode formed herein cannot be processed by any means. Colors formed from the data of the image in YUV color mode are real colors of the image, and thus the data of the image in YUV color mode can be processed. During common processing of an image, the RGB data may usually be processed, wherein color mode conversion, which is raw data→an image in RGB color mode→an image in YUV color mode, may be performed for the raw data captured by the image sensor. The image in RGB color mode may be processed to obtain a processed image in RGB color mode, and then the processed image in RGB color mode may be converted into an image in YUV color mode to obtain an image in JPG format. Accordingly, when images in other color modes is processed, the images must be converted into images in YUV color mode, and then images in JPG format may be obtained after the images are converted into the images in YUV color mode.

In this embodiment, the obtained image in the chrominance-luminance separated color mode may be an image in YUV color mode or LAB color mode. When the method for image processing of the present disclosure is applied in a mobile phone, alternatively, the image in the chrominance-luminance separated color mode may be an image in YUV color mode, and the image in YUV color mode may be processed without any redundant image conversion procedures after being captured by the image capture apparatus, reducing the process of image conversion and improving efficiency of image processing.

At block 202, the method determines a filtering kernel for performing a filtering processing on the image according to a result of the edge identification.

At block 203, the method performs filtering processing on the image based on the filtering kernel to obtain a low-frequency image and a high-frequency image corresponding to the image.

Alternatively, taking an image in YUV color mode as an example, data of the image in YUV color mode is stored in planar format. In other words, Y, U, and V components are respectively stored in different matrices. When the luminance components of all pixels in the image are traversed, the matrix for storing the Y component is read, and then the respective luminance component of the respective pixel in the image may be obtained.

In this embodiment, the luminance components of the image are filtered, which means the image in basic color mode is processed. Thus, there is no damage to the chrominance component of the image, and it avoids color distortion and loss of detail information during image processing. For example, only the Y component in YUV color mode is filtered to obtain a high-frequency image and a low-frequency image associated with the Y component, and the Y component is adjusted and converted in subsequent enhancement processing, which does not affect a ratio between the U component and the V component at all. As such, it is guaranteed that the color of the image is not distorted during the processing, and contrast of the image is improved without damaging the color of the image.

At block 204, the method calculates a local variance of a window with a preset size and with a reference pixel as a center in the high-frequency image.

At block 205, the method determines a gain value of the reference pixel according to a local standard deviation corresponding to the local variance of the window.

At block 206, the method determines a first gain coefficient of the high-frequency image according to gain values of all reference pixels in the high-frequency image.

Exemplarily, a reference pixel is any pixel (i, j), whose luminance component is x (i, j), wherein i is horizontal coordinate of the reference pixel in the image, and j is vertical coordinate of the reference pixel in the image. The size of the window may be (2n+1)·(2n+1), wherein n is an integer greater than or equal to 0. The above size of the window is only as an example. In other embodiments, the above window may be in the form of a rectangle. That is, the above window is in a form of (2n+1)·(2m+1).

The local variance of the window can be calculated via the following formula:

$$\sigma_x^2(i, j) = \frac{1}{(2n+1)^2} \sum_{k=i-n}^{i+n} \sum_{l=j-n}^{j+n} [x(k, l) - m_x(i, j)]^2.$$

$$m_x(i, j) = \frac{1}{(2n+1)^2} \sum_{k=i-n}^{i+n} \sum_{l=j-n}^{j+n} x(k, l).$$

Wherein,

In the above formula, $m_x(i,j)$ is a local average value of the window, and x(k,l) is a luminance component of a pixel in the window, wherein k and l are integers greater than or equal to 0.

$\sigma_x(i, j)$ is the local standard deviation of the window with the reference pixel as the center. Alternatively, the gain value of the reference pixel is inversely proportional to the local standard deviation. For example, the gain value of the reference pixel may be $D/\sigma_x(i, j)$. Alternatively, the gain value of the reference pixel is greater than 1 to achieve enhancement of the luminance components of the pixels in the high-frequency image, wherein D is a constant.

In this embodiment, through the above manner, the gain value of each pixel in the high-frequency image is determined, and the first gain coefficient of the high-frequency image is further determined. The first gain coefficient includes gain values of all pixels in the high-frequency image.

At block 207, the method corrects the first gain coefficient according to a result of scene identification for the image.

Exemplarily, the result of the scene identification for the image may be to determine a ratio of high-frequency information to low-frequency information in the image. That is, the result of the scene identification may include a radio of high-frequency information to low-frequency information in the image. When the ratio of the high-frequency information to the low-frequency information is relatively large, it indicates the high-frequency image contains a large number of pixels to be enhanced. When the high-frequency image is enhanced according to the first gain coefficient, noise in the image is easily amplified to generate image excess, which affects the image quality. In this embodiment, when the ratio of the high-frequency information to the low-frequency information is relatively large, the first gain coefficient is adaptively reduced, such that the first gain coefficient is corrected. Thus, it is realized that the first gain coefficient is adaptively adjusted according to the result of scene identification for the image to not enhance noise. Each pixel in the high-frequency image has a different adjustment value for the gain value of the pixel. Alternatively, the adjustment value for the gain value is determined according to the luminance component of the respective pixel. For example, the adjustment value for the gain value is negatively correlated with the luminance component of the respective pixel. For example, a bright area having a large luminance component is set with a small adjustment value for the gain coefficient, and a dark area having a small luminance component is set with a large adjustment value for the gain coefficient. Specifically, the correcting the first gain coefficient is that an original gain value is subtracted by a corresponding adjustment value for each pixel in the high-frequency image, corrected gain value is then obtained, and then the first gain coefficient of the high-frequency image is further corrected. The gain coefficient is corrected according to the luminance components of all pixels, which avoids noise amplification caused when the dark region is enhanced with a large gain.

At block 208, the method performs an enhancement processing for the high-frequency image according to the corrected first gain coefficient.

At block 209, the method performs image fusion for the low-frequency image and the enhanced high-frequency image to obtain a processed image.

In the method for image processing according to embodiments of the present disclosure, the luminance components of the image in the chrominance-luminance separated color mode are filtered to obtain the a low-frequency image and a high-frequency image associated with the luminance components, an adaptive gain value of each pixel is determined according to the luminance component of the pixel in the high-frequency image to generate the first gain coefficient of the high-frequency image, and the high-frequency image is enhanced to obtain the processed image. Since the independent luminance components are analyzed and processed, color of the image cannot be affected. It improves the contrast of the image under a case where no color distortion is ensured, and a range of the image is dynamically enlarged to make details in the image definite, which improves image quality.

Figure 3:
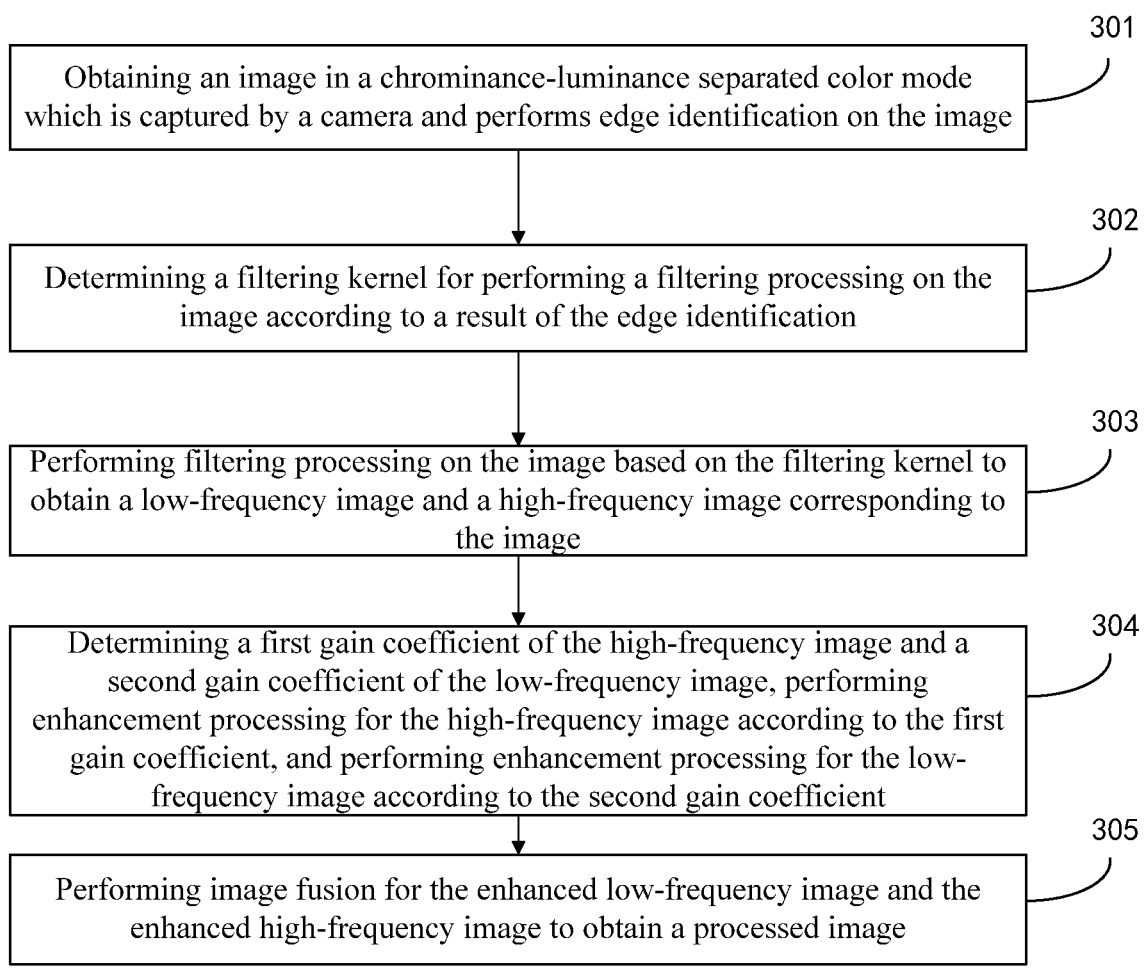
FIG. 3 is a flow chart diagram of yet another method for image processing according to an embodiment of the present disclosure.

FIG. 3 is a flow chart diagram of yet another method for image processing according to an embodiment of the present disclosure. Referring to FIG. 3, the method may include actions/operations in the following blocks.

At block 301, the method obtains an image in a chrominance-luminance separated color mode which is captured by a camera and performs edge identification on the image.

At block 302, the method determines a filtering kernel for performing a filtering processing on the image according to a result of the edge identification.

At block 303, the method performs filtering processing on the image based on the filtering kernel to obtain a low-frequency image and a high-frequency image corresponding to the image.

At block 304, the method determines a first gain coefficient of the high-frequency image and a second gain coefficient of the low-frequency image, performs enhancement processing for the high-frequency image according to the first gain coefficient, and performs enhancement processing for the low-frequency image according to the second gain coefficient.

It should be noted that the low-frequency image includes background information and detail information of the image. For example, an original image includes a black button and a dot stain on the white desktop, and the high-frequency image obtained by filtering processing may include the black button and a low-frequency image includes the white desktop and dot stain on the desktop, wherein dot stain are details in low-frequency image. In this embodiment, since enhancement processing are synchronically performed for the high-frequency image and the low-pass image, all the content information in the image is enhanced at the same time, which avoids the loss of the detail information in the low-frequency image.

The manner of determining the second gain coefficient of the low-frequency image is same to that for the high-frequency image, which are not described herein.

Alternatively, before enhancement processing is performed for the high-frequency image according to the first gain coefficient and enhancement processing is performed for the low-frequency image according to the second gain coefficient, the first gain coefficient and the second gain coefficient are corrected according to a result of scene identification of the image, and then the high-frequency image is enhanced based on the corrected first gain coefficient and the low-frequency image is enhanced based on the corrected second gain coefficient.

At block 305, the method performs image fusion for the enhanced low-frequency image and the enhanced high-frequency image to obtain a processed image.

In the method for image processing according to embodiments of the present disclosure, for an image in chrominance-luminance separated color mode, luminance components of the image are filtered to obtain the high-frequency image and the low-frequency image, the first gain coefficient and the second gain coefficient are calculated respectively, the high-frequency image is enhanced according to the first gain coefficient, the low-frequency image is enhanced according to the second gain coefficient, and image fusion is performed for the enhanced high-frequency image and the enhanced low-frequency image to obtain the processed image. Thus, contrast in the high-frequency image and the low-frequency image are improved simultaneously, loss of the details during the image processing is avoided, and image definition is improved under a case where no image distortion occurs.

Figure 4:
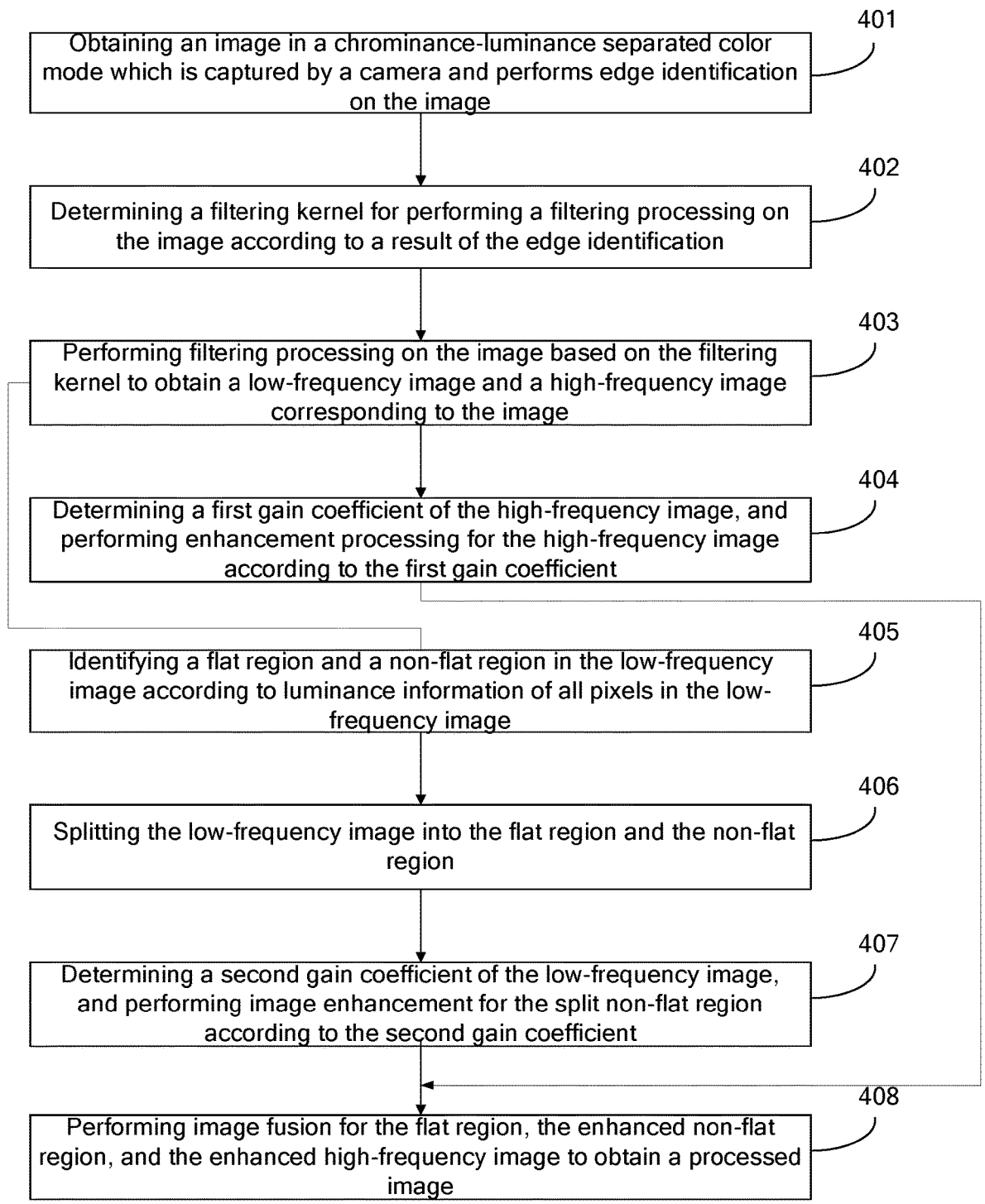
FIG. 4 is a flow chart diagram of yet another method for image processing according to an embodiment of the present disclosure.

FIG. 4 is a flow chart diagram of yet another method for image processing according to an embodiment of the present disclosure. Referring to FIG. 4, the method may include actions/operations in the following blocks.

At block 401, the method obtains an image in a chrominance-luminance separated color mode which is captured by a camera and performs edge identification for the image.

At block 402, the method determines a filtering kernel for performing a filtering processing on the image according to a result of the edge identification.

At block 403, the method performs filtering processing for luminance components of the image based on the filtering kernel to obtain a low-frequency image and a high-frequency image corresponding to the image.

At block 404, the method determines a first gain coefficient of the high-frequency image, and performs enhancement processing for the high-frequency image according to the first gain coefficient.

At block 405, the method identifies a flat region and a non-flat region in the low-frequency image according to luminance information of all pixels in the low-frequency image.

At block 406, the method splits the low-frequency image into the flat region and the non-flat region.

At block 407, the method determines a second gain coefficient of the low-frequency image, and performs image enhancement for the split non-flat region according to the second gain coefficient.

At block 408, the method performs image fusion for the flat region, the enhanced non-flat region, and the enhanced high-frequency image to obtain a processed image.

In some embodiments, the identifying the flat region and a non-flat region in the low-frequency image according to luminance information of all pixels in the low-frequency image may include performing partitioning processing for the low-frequency image to obtain a plurality of image-regions and determining pixel difference values of the image-regions; determining the image-regions whose pixel difference values are smaller than or equal to a preset value to belong to the flat region; and determining the image-regions whose pixel difference values are greater than the preset value to belong to the non-flat region. That is, the flat region includes the image-regions of which pixel difference values are smaller than or equal to a preset value, and the non-flat region includes the image-regions of which pixel difference values are greater than the preset value.

For any of the image-regions, the pixel difference value of the image-region may be calculated by the following formula:

$$A = \frac{1}{p}\sum_{b=1}^{p}(g_b - \bar{g}).$$

Wherein A is a pixel difference value of the image-region; P is a total number of pixels in the image-region; $g^b$(b=1, 2 . . . p) is a luminance component of a pixel in the image-region; $\bar{g}$ is a local luminance mean value of the image-region; and both p and b are positive integers greater than 0.

The pixel difference value indicates a difference condition of luminance information of all pixels in the image-region. For example, a larger pixel difference value indicates that luminance information of all pixels in the image-region differs largely, and a smaller pixel difference value indicates that the luminance information of all pixels in the image-region has higher similarity. The image-regions whose pixel difference values are smaller than or equal to the preset value are spliced to form the flat region, and the image-regions whose pixel difference values are larger than the preset value are spliced to form the non-flat region. Alternatively, the preset value for determining the flat region and the non-flat region is related to a local difference mean value $\overline{A}$ of the low-frequency image. That is, the preset value for determining the flat region and the non-flat region is determined according to the local difference mean value $\overline{A}$. Specifically, the local difference mean value $\overline{A}$ of the low-frequency image is determined according to the number of image-regions and the pixel difference value A of the respective image-region. The preset value may be $\lambda\overline{A}$ by introducing a coefficient $\lambda$. In other words, when a pixel difference value $A \leq \lambda\overline{A}$, the image-region with the pixel difference value A belongs to the flat region; and when the pixel difference value $A > \lambda\overline{A}$, the image-region with pixel difference value A belongs to the non-flat region.

Exemplarily, for an image including a black button and dot stains on the white desktop, the high-frequency image obtained by the filtering processing may include the black button, and the low-frequency image includes the white desktop and dot stains on the desktop. In the low-frequency image, a portion with the dot stains is a non-flat region, and the white desktop as the background region is a flat region. In the above embodiment, it can be learned that, the gain value of the pixel is inversely proportional to the local standard deviation. Since the local standard deviation of the flat region is quite small, the gain value of the pixel is relatively large, and thus noise amplification will be introduced. In this embodiment, a flat region and a non-flat region are identified and spitted from the image, and only the non-flat region is enhanced. That is, no adjustment is performed for luminance components in the flat region, which avoids noise amplification in the flat region when the image is enhanced.

In the method for image processing according to embodiments of the present disclosure, the flat region and the non-flat region are split from the low-frequency image, and the non-flat region is enhanced to avoid loss of details in the low-frequency image, maintain the brightness of the flat region, and avoid noise amplification.

In one embodiment, a preview image or a captured image in YUV color mode captured by a camera may be displayed on a display interface of an electronic device (e.g. a mobile phone), and an instruction for color enlargement input by a user may be fetched. The instruction for color enlargement may be input in a way that the user clicks a virtual controller (for example, a proportional integral controller) on the display interface, or by the user's touching gestures or voice commands Edge identification is performed on the image displayed in the display interface according to an image processing instruction, a filter kernel of the low-pass filter is determined according to a result of the edge identification and low-pass filtering is performed for the luminance components of the image to obtain a high-frequency image and a low-frequency image related to the luminance components, the gain coefficients for the high-frequency image and the low-pass image are calculated, respectively, the flat region and the non-flat region are identified and split from the low-frequency image, the high-frequency image and the non-flat region of the low-frequency image are enhanced, and image fusion is performed for the flat region, the enhanced non-flat region, and the enhanced high-frequency image to obtain the processed image. In this embodiment, since an image in YUV color mode is directly processed, it saves time for color mode conversion, and as only the Y components of the image are processed, it does not affect a ratio between the Us and Vs, and does not have any change in the chrominance components. That is, the color of the image will not be damaged, and no distortion will occur in any area of the image. As the high-frequency image and the non-flat region of the low-frequency image are enhanced, details in the image are enhanced, and the flat region of the low-frequency image is maintained. Thus, noise is controlled to avoid amplification of noise.

Figure 5:
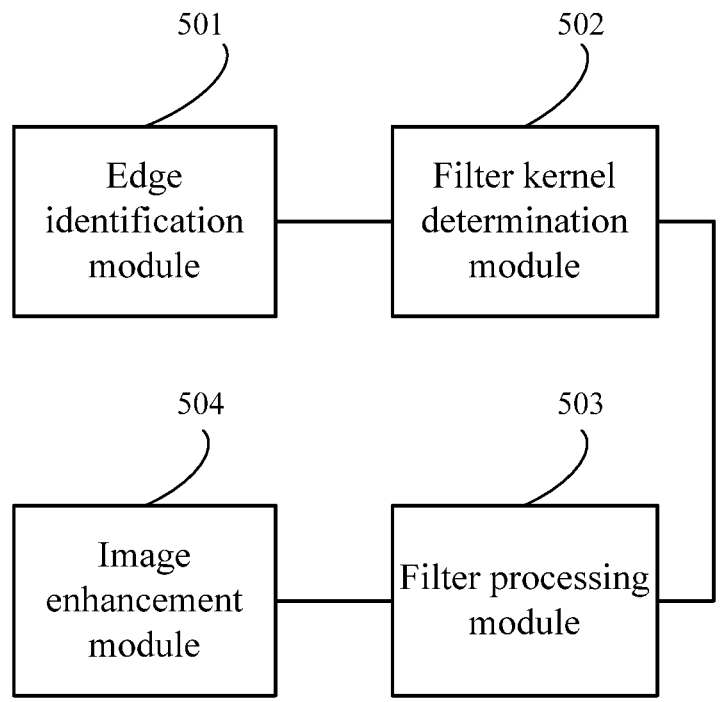
FIG. 5 is a structural diagram of an apparatus for image processing according to an embodiment of the present disclosure.

FIG. 5 is a structural diagram of an apparatus for image processing according to an embodiment of the present disclosure. The apparatus may be realized by software and/or hardware and may usually be integrated into an electronic device to execute the method for image processing. Referring to FIG. 5, the apparatus may include an edge identification module 501, a filter kernel determination module 502, a filter processing module 503, and an image enhancement module 504.

The edge identification module 501 is configured to obtain an image captured by a camera and perform edge identification on the image.

The filter kernel determination module 502 is configured to determine a filtering kernel for performing a filtering processing on the image according to a result of the edge identification.

The filter processing module 503 is configured to perform filtering processing on the image based on the filtering kernel to obtain a low-frequency image and a high-frequency image corresponding to the image.

The image enhancement module 504 is configured to perform an enhancement processing for the high-frequency image and performs image fusion for the low-frequency image and the enhanced high-frequency image to obtain a processed image.

In the apparatus for image processing according to embodiments of the present disclosure, different types of filtering kernels are adopted for the differences of images captured by the electronic device, which avoids the problem that loss of image information is caused since the fixed filtering kernel is poorly applicable, and is suitable for captured images by the electronic device with different scenes and different complexities.

Based on the above embodiments, the filter kernel determination module 502 is configured to the following actions/operations.

Determining an edge coefficient in the image according to the result of the edge identification.

Determining a size of the filtering kernel for performing filtering processing on the image according to the edge coefficient, wherein the size of the filtering kernel is positively correlated with the edge coefficient.

Based on the above embodiments, the image enhancement module 504 may include the following.

A local variance determining unit, which is configured to calculate a local variance of a window with a preset size and with a reference pixel as a center in the high-frequency image.

A gain value determining unit, which is configured to determine a gain value of a reference pixel according to a local standard deviation corresponding to the local variance of the window.

A first gain coefficient determining unit, which is configured to determine a first gain coefficient of the high-frequency image according to gain values of all reference pixels.

A first enhancement processing unit, which is configured to perform an enhancement processing for the high-frequency image according to the first gain coefficient.

Based on the above embodiments, the apparatus further includes the following.

A gain coefficient correction module, which is configured to correct the first gain coefficient according to a result of scene identification for the image before an enhancement processing is performed for the high-frequency image according to the first gain coefficient.

Based on the above embodiments, the apparatus further includes the following.

A low-frequency image enhancement processing module, which is configured to determine a second gain coefficient of the low-frequency image, and perform enhancement processing for the low-frequency image according to the second gain coefficient.

Correspondingly, the image enhancement module 504 is configured to perform image fusion for the enhanced high-frequency image and the enhanced low-frequency image to obtain the processed image.

Based on the above embodiments, the low-frequency image enhancement processing module may include the following.

An image identification unit, which is configured to identify a flat region and a non-flat region in the low-frequency image according to luminance information of all pixels in the low-frequency image.

An image splitting unit, which is configured to split the low-frequency image into the flat region and the non-flat region.

A non-flat area enhancement processing unit, which is configured to perform image enhancement for the split non-flat region according to the second gain coefficient.

Correspondingly, the image enhancement module 504 is configured to perform image fusion for the flat region, the enhanced non-flat region, and the enhanced high-frequency image to obtain a processed image.

Based on the above embodiments, the image identification unit is configured to the following actions/operations.

Performing partitioning processing for the low-frequency image to obtain a plurality of image-regions and determining pixel difference values of the image-regions.

Determining the image-regions whose pixel difference values are smaller than or equal to a preset value to belong to the flat region.

Determining the image-regions whose pixel difference values are greater than the preset value to belong to the non-flat region.

Based on the above embodiments, the image is an image in a chrominance-luminance separated color mode. The chrominance-luminance separated color mode may include a YUV color mode and a LAB color mode.

Based on the above embodiments, the apparatus further includes the following.

A generating module for the YUV color mode image, which is configured to convert raw signals captured by an image sensor of the camera into an image in the RGB color mode, and generate an image in the YUV color mode based on the image in the RGB color mode.

The present disclosure may further provide a storage medium, which may include instructions executable by a processor of a computer, wherein the instructions may be used to execute the method for image processing while executed by the processor of the computer, the method may include the following actions/operations.

The method obtains an image captured by a camera and performs edge identification on the image.

The method determines a filtering kernel for performing a filtering processing on the image according to a result of the edge identification.

The method performs filtering processing on the image based on the filtering kernel to obtain a low-frequency image and a high-frequency image corresponding to the image.

The method performs an enhancement processing for the high-frequency image and performs image fusion for the low-frequency image and the enhanced high-frequency image to obtain a processed image.

A storage medium may be any type of non-transitory memory devices or storage devices. The term "storage medium" intends to include an installation medium, such as devices of CD-ROM, a floppy disk or a tape; non-transitory memory of a computer system or random access memory, such as DRAM, DDRRAM, SRAM, EDORAM, Rambus RAM and the like; non-volatile memory, such as flash memory, magnetic medium (such as hard disk or optical storage); a register or other types of elements for storage. The storage medium may also include other types of storage or combination thereof. In addition, the storage medium may be located in a first computer system of which programs may be executed, or located in a second computer system different from the first one, wherein the second computer system may be connected to the first computer system via a network (such as internet). The second computer system may provide systemic instructions for the first computer to execute. The term "storage medium" may include two or more storage media residing at different locations (for example, different computer systems connected via internet). The storage medium may store program instructions, which can be executed by one or more processors (for example, a specific realization may be a computer program).

An embodiment of the present disclosure may provide a storage medium including instructions executable by computers, wherein the instructions executable by computers may not be limited to the above-mentioned operations for image processing, but may include any related operations of the image processing methods provided by any of the embodiments in the present disclosure.

Figure 6:
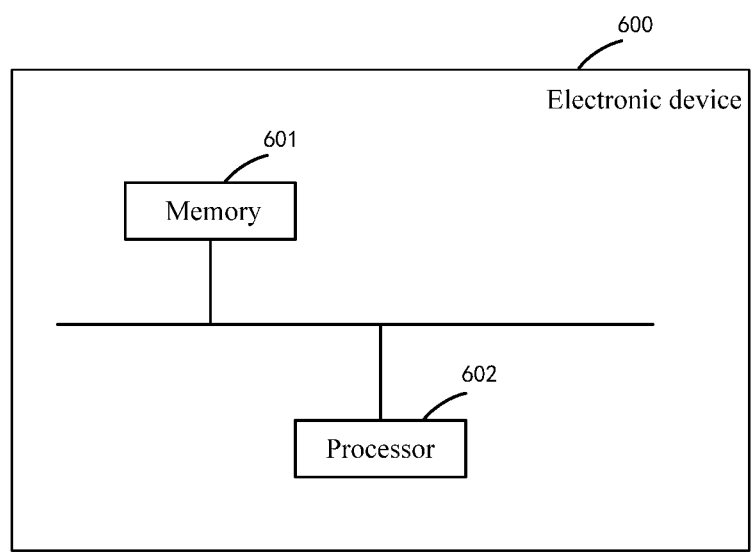
FIG. 6 is a structural diagram of an electronic device according to an embodiment of the present disclosure.

The present disclosure may provide an electronic device, which may integrate an image processing apparatus provided by embodiments of the present disclosure. FIG. 6 is a structural diagram of an electronic device according to an embodiment of the present disclosure. The electronic device 600 may include a non-transitory memory 601, a processor 602, and a computer program stored in the non-transitory memory 601 and executed by the processor 602, wherein the processor 602 may execute the computer program to realize the method for image processing as described by the present disclosure.

In the electronic device according to embodiments of the present disclosure, different types of filtering kernels are adopted for the differences of images captured by the electronic device, which avoids the problem that loss of image information is caused since the fixed filtering kernel is poorly applicable, and is suitable for captured images by the electronic device with different scenes and different complexities.

Figure 7:
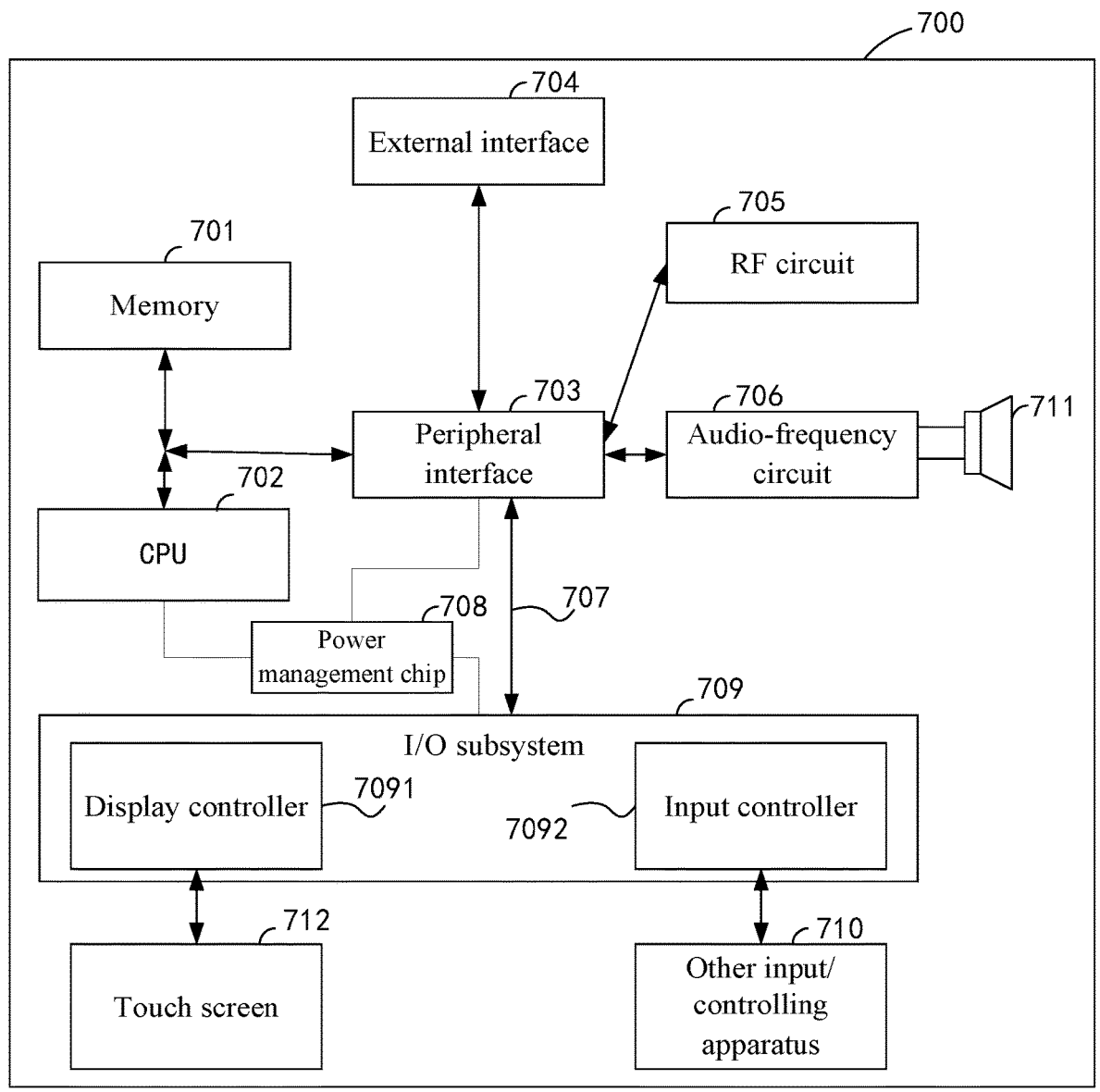
FIG. 7 is a structural diagram of another electronic device according to an embodiment of the present disclosure.

FIG. 7 is a structural diagram of yet another electronic device provided by embodiments of the present disclosure. The electronic device may include a housing (not shown in the figure), a non-transitory memory 701, a central processing unit (CPU) 702, a circuit board (not shown in the figure), and a power circuit (not shown in the figure). The circuit board may be disposed within the space defined by the housing. The CPU 702 and the non-transitory memory 701 may be arranged on the circuit board. The power circuit may provide power to each circuit or element of the electronic device. The non-transitory memory 701 may store codes for executable programs. The CPU 702 may run computer programs corresponding to the executable program codes by reading the executable program codes stored in the non-transitory memory 701. In such a way, the following actions/operations may be achieved.

An image captured by a camera and performs edge identification on the image is obtained.

A filtering kernel for performing a filtering processing on the image is determined according to a result of the edge identification.

Filtering processing is performed on the image based on the filtering kernel to obtain a low-frequency image and a high-frequency image corresponding to the image.

An enhancement processing for the high-frequency image is performed and image fusion is performed for the low-frequency image and the enhanced high-frequency image to obtain a processed image.

The electronic device may further include a peripheral interface 703, a radio frequency (RF) circuit 705, an audio-frequency circuit 706, a loudspeaker 711, a power management chip 708, an input/output (I/O) subsystem 709, other input/controlling apparatus 710, a touch screen 712, other input/controlling apparatus 710, and an external interface 704, all of which may communicate through one or more communication buses or signal lines 707.

It should be understood that, the electronic device 700 shown in the figure is only an example of electronic devices, the electronic device 700 may contain more or less of the components than those illustrated in the figure, two or more of the components may be combined, or the arrangement of the components may be changed. The components illustrated in the figure may be realized by hardware, software, or combination thereof, wherein the hardware and software may include one or more signal processors and/or application specific integrated circuits.

The electronic device for image processing operations provided by the present disclosure will be described in details herein, and a mobile phone may be used as an example of the electronic device.

The non-transitory memory 701 may be accessed by the CPU 702, peripheral interface 703 and the like. The non-transitory memory 701 may include high speed random access memory or non-volatile memory such as disk type storage device, a flash memory device, or other volatile solid state memory device.

The peripheral interface 703 may connect input and output of the device to the CPU 702 and the non-transitory memory 701.

The I/O subsystem 709 may set input and output peripheral. For example, the touch screen 712 and other input/controlling devices 710 may be connected to the peripheral interface 703. The I/O subsystem 709 may include a display controller 7091 and one or more input controllers 7092 to control other input/controlling devices 710. The one or more input controllers 7092 may receive electrical signals from other input/controlling devices 710 or send electrical signals to other input/controlling devices 710, wherein the other input/controlling devices 710 may include a physical button (a pressing button, a rocker button and the like), a dial plate, a sliding switch, a joystick, or a clicking wheel. To be noted that, the input controller 7092 may connect to any one of the following: a keyboard, an infrared port, an USB interface, and an indicating equipment such as a mouse.

The touch screen 712 may an input interface and an output interface between a user and the electronic device of the user. Visual output may be displayed to the user, wherein the visual output may include a graph, a text, an icon, a video, and the like.

The display controller 7091 of the I/O subsystem 709 may receive electrical signals from the touch screen 712 or send electrical signals to the touch screen 712. The touch screen 712 may detect touching of the screen, the display controller 7091 may convert the detected touching into an interaction with a user interface object displayed on the touch screen 712, which realizes human-computer interaction. The user interface object displayed on the touch screen 712 may be an icon for running a game, an icon for connecting into a certain network, and the like. To be noted that, the device may also include an optical mouse, which is a touch-sensitive surface without display of visual output or an extension of the touch-sensitive surface defined by the touch screen.

The RF circuit 705 may be used to establish communication between the mobile phones and wireless network (i.e. a network side), realizing data receipt and sending between the mobile phone and the wireless network. For example, receiving and sending messages, emails and the like. To be specific, the RF circuit 705 may receive and send RF signals, which are also called electromagnetic signals, the RF circuit 705 may convert electrical signals into electromagnetic signals or convert electromagnetic signals into electrical signals, and communicate with communication networks and other devices through the electromagnetic signals. The RF circuit 705 may include a known circuit for executing the above functions, wherein the known circuit may include but not limit to an antenna system, an RF transceiver, one or more amplifiers, a tuner, one or more oscillators, a digital signal processor, a chipset of coder-decoder, a subscriber identity module (SIM), and the like.

The audio-frequency circuit 706 may receive audio-frequency data from the peripheral interface 703, and convert the audio-frequency data into electrical signals, which may be sent to the loudspeaker 711.

The loudspeaker 711 may reconvert the audio signals received from the wireless network through the RF circuit of the mobile phone into the sound, and play the sound to the user.

The power management chip 708 may supply power to hardware connected through the CPU 702, the I/O subsystem and the peripheral interface, and perform power management.

The apparatus for image processing, the storage medium, and the electronic device provided by the above-mentioned embodiments may execute the method for image processing provide by any of the embodiments, and have corresponding functional modules to execute the methods and achieve the beneficial effects. Technical details that are not detailed described in the above embodiment may refer to the method for image processing described in any of the embodiments.

To be noted that, the above may only be a preferred embodiment and application of the technical principles of the present disclosure. Those skilled in the art should understand, the present disclosure may not be limited to the specific embodiments herein, any obvious transformation, readjustment and replacement should not depart from the scope of the present disclosure. Therefore, although the present disclosure may be described in details through the above embodiments, the present disclosure should not be limited to the above embodiments. Without departing from the conception of the present disclosure, more of other equivalent embodiments may be included in the present disclosure, and the scope of the present disclosure should be defined by the scope of the claims.

What is claimed is:

1. A method for image processing, applied for an electronic device, comprising:
performing edge identification on an image;
determining a filtering kernel for a filtering processing on the image according to a result of the edge identification;
performing the filtering processing on the image based on the filtering kernel to obtain a low-frequency image and a high-frequency image corresponding to the image;
determining a first gain coefficient of the high-frequency image, wherein the first gain coefficient comprises gain values of all pixels in the high-frequency image, wherein one gain value of one pixel is determined according to a local standard deviation of a window with a preset size and with the one pixel as a center, wherein the local standard deviation of the window is obtained by calculating a local variance of the window;
performing an enhancement processing for the high-frequency image according to the first gain coefficient; and
performing image fusion for the low-frequency image and the enhanced high-frequency image to obtain a processed image.

2. The method according to claim 1, wherein the electronic device comprises a camera, the image is captured by the camera and in a chrominance-luminance separated color mode, and the chrominance-luminance separated color mode comprises YUV color mode and LAB color mode; and
the performing the filtering processing comprises:
performing the filtering processing for luminance components of the image based on the filtering kernel.

3. The method according to claim 2, wherein the camera comprises an image sensor; and
generating the image in the chrominance-luminance separated color mode comprises:
converting raw signals captured by the image sensor into an image in RGB color mode; and
generating the image in YUV color mode based on the image in RGB color mode.

4. The method according to claim 1, wherein determining a filtering kernel for a filtering processing on the image according to a result of the edge identification comprises:
determining an edge coefficient in the image according to the result of the edge identification, wherein the edge coefficient indicates edge information in the image; and
determining a size of the filtering kernel according to the edge coefficient, wherein the size of the filtering kernel is positively correlated with the edge coefficient.

5. The method according to claim 1, wherein the image is divided into a non-background region where edge information is located and a background region; and
a size of the filtering kernel is adaptively determined according to a location where edge information is located, wherein the size of the filtering kernel for the non-background region is larger than that for the background region.

6. The method according to claim 1, wherein the one gain value of the one pixel is inversely proportional to the local standard deviation of the window with the one pixel as a center.

7. The method according to claim 1, before performing the enhancement processing for the high-frequency image according to the first gain coefficient, further comprising:
correcting the first gain coefficient according to a result of scene identification for the image; wherein the result of scene identification comprises a radio of high-frequency information to low-frequency information in the image.

8. The method according to claim 7, wherein the first gain coefficient is reduced when the radio of high-frequency information to low-frequency information in the image is larger than a preset value.

9. The method according to claim 8, wherein the gain values in the first gain coefficient have different adjustment values; and
one of the gain values is subtracted by one corresponding adjustment value such that the first gain coefficient is reduced.

10. The method according to claim 9, wherein the adjustment values are determined according to luminance components of all pixels in the high-frequency image, wherein an adjustment value for one pixel is negatively correlated with a luminance component of the one pixel.

11. The method according to claim 1, further comprising:
determining a second gain coefficient of the low-frequency image;
performing enhancement processing for the low-frequency image according to the second gain coefficient; and
performing image fusion for the enhanced high-frequency image and the enhanced low-frequency image to obtain the processed image.

12. The method according to claim 11, wherein performing enhancement processing for the low-frequency image according to the second gain coefficient comprises:
identifying a flat region and a non-flat region in the low-frequency image according to luminance information in the low-frequency image; and
performing the image enhancement for the non-flat region according to the second gain coefficient; and
wherein the processed image is obtained by performing image fusion for the flat region, the enhanced non-flat region, and the enhanced high-frequency image.

13. The method according to claim 12, wherein the low-frequency image is partitioned into a plurality of image-regions, and each image-region has a pixel difference value indicating a difference condition of luminance information of all pixels in the each image-region;
the flat region comprises the image-regions of which pixel difference values are smaller than or equal to a preset value; and
the non-flat region comprises the image-regions of which pixel difference values are greater than the preset value.

14. The method according to claim 13, wherein the pixel difference value of the each image-region is calculated in the following formula:

$$A = \frac{1}{p}\sum_{b=1}^{p}(g_b - \overline{g})$$

wherein A is the pixel difference value, p is a total number of pixels in the each image-region, $g_b$ (b=1,2, . . . p) is a luminance component of one pixel in the each image-region, $\bar{g}$ is a local luminance mean value of the each image-region, and both p and b are positive integers greater than 0; and the preset value is determined according to a local difference mean value calculated according to a number of the image-regions and the pixel difference value of the each image-region.

15. An electronic device, comprising a camera configured to capture an image, a non-transitory memory storing a computer program, and a processor, wherein the processor is configured to execute the computer program to:

perform edge identification and an adaptive filtering processing on the image to obtain a low-frequency image and a high-frequency image corresponding to the image, wherein a filtering kernel of the adaptive filtering processing is adaptively determined according to edge information in the image;

determine a first gain coefficient of the high-frequency image, wherein the first gain coefficient comprises gain values of all pixels in the high-frequency image, wherein one gain value of one pixel is determined according to a local standard deviation of a window with a preset size and with the one pixel as a center, wherein the local standard deviation of the window is obtained by calculating a local variance of the window;

perform an enhancement processing for the high-frequency image according to the first gain coefficient; and perform image fusion for the low-frequency image and the enhanced high-frequency image to obtain a processed image.

16. The electronic device according to claim 15, wherein the image is divided into a plurality of regions; and the size of the filtering kernel for one region with edge information is larger than that for another region without edge information.

17. The electronic device according to claim 15, wherein the image is in a chrominance-luminance separated color mode, and the chrominance-luminance separated color mode comprises YUV color mode and LAB color mode; and luminance components of the image are performed the filtering processing.

18. The electronic device according to claim 17, wherein the camera comprises an image sensor configured to capture raw signals; and the image in YUV color mode is generated based on an image in RGB color mode converted from the raw signals.

19. A non-transitory storage medium storing a computer program, when executed, causing a processor to:

perform edge identification and an adaptive filtering processing on the image to obtain a low-frequency image and a high-frequency image corresponding to the image, wherein a filtering kernel of the adaptive filtering processing is adaptively determined according to edge information in the image;

determine a first gain coefficient of the high-frequency image, wherein the first gain coefficient comprises gain values of all pixels in the high-frequency image, wherein one gain value of one pixel is determined according to a local standard deviation of a window with a preset size and with the one pixel as a center, wherein the local standard deviation of the window is obtained by calculating a local variance of the window;

perform an enhancement processing for the high-frequency image according to the first gain coefficient; and perform image fusion for the low-frequency image and the enhanced high-frequency image to obtain a processed image.

* * * * *